L. B. FREED.
POWER ATTACHMENT.
APPLICATION FILED DEC. 14, 1918.
1,311,339.
Patented July 29, 1919.
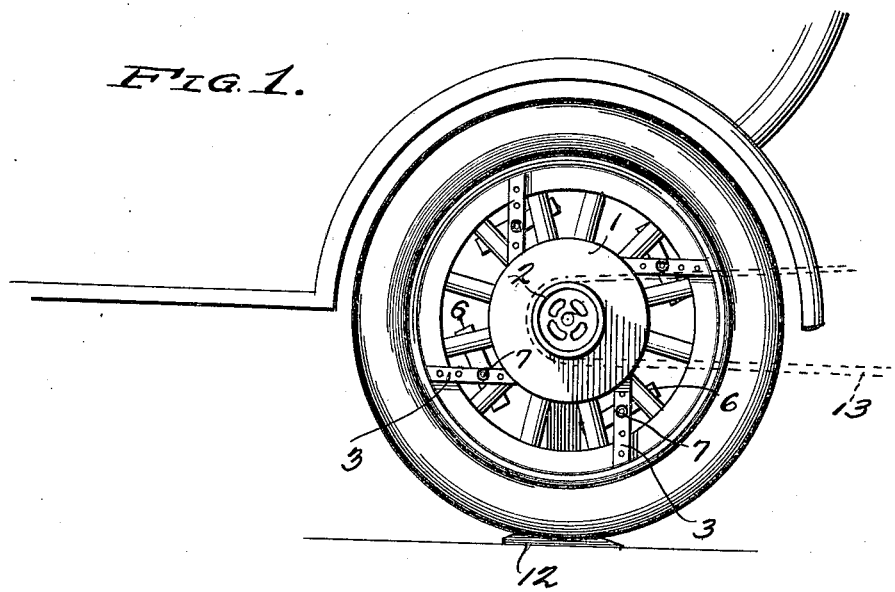
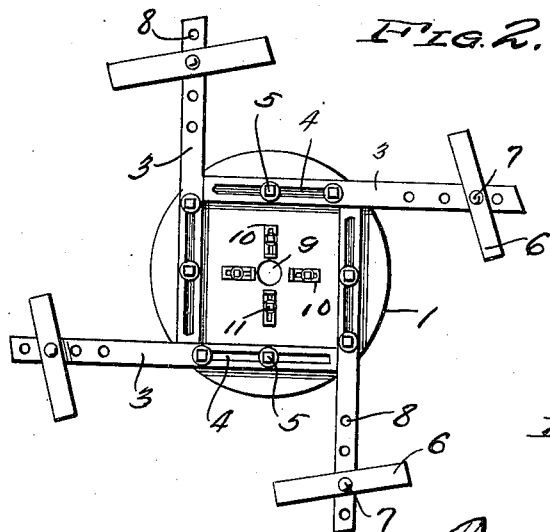
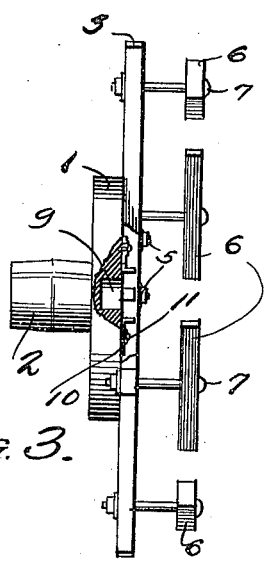
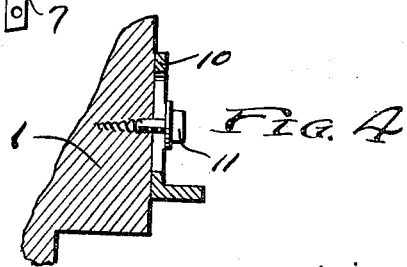
Witnesses
Inventor
Liegh B. Freed
By
Attorney

UNITED STATES PATENT OFFICE.

LIEGH B. FREED, OF WILLIAMSTOWN, OHIO.

POWER ATTACHMENT.

1,311,339.   Specification of Letters Patent.   Patented July 29, 1919.

Application filed December 14, 1918. Serial No. 266,764.

*To all whom it may concern:*

Be it known that I, LIEGH B. FREED, a citizen of the United States, residing at Williamstown, in the county of Hancock and State of Ohio, have invented certain new and useful Improvements in Power Attachments, of which the following is a specification.

The present invention aims primarily to utilize a motor vehicle as means for operating any machinery to be driven mechanically and to obviate the expense incident to the provision of an engine for driving machinery on a farm or other place requiring the machine to be operated at stated periods only.

In accordance with the present invention provision is had for utilizing one of the drive wheels of a motor vehicle such drive wheel being jacked up so as to run free, thereby enabling the clutch and other control of the engine to be utilized in governing the speed and power required for operating the machine to be driven.

The invention provides an attachment which may be readily applied to and disconnected from the drive wheel of a motor vehicle, said attachment embodying a belt pulley from which power may be taken for operating the part to be driven by means of a belt and said attachment also embodying fastening means whereby the attachment may be clamped to the driven wheel and made secure in the required position.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawing,

Figure 1 is a detail view in elevation of part of a motor vehicle showing the invention applied to a drive wheel thereof, Fig. 2 is a detail view in elevation of the attachment as seen from the inner side, Fig. 3 is an edge view, a portion being broken away, Fig. 4 is a sectional detail of a portion of the base and one of the centering elements showing the parts on a larger scale.

Corresponding and like parts are referred to in the following description and indicated in the several views of the drawing by like reference characters.

The attachment comprises a disk or plate 1 which constitutes a base, a belt pulley 2 and centering and clamping devices. The base 1 is provided upon one side with the belt pulley 2 and the parts may be of any relative size, construction and material.

The clamping means comprise a plurality of members or bars 3 which are secured to a side of the base 1. As indicated most clearly in Fig. 2 the bars or members 3 have an approximately tangential arrangement and the inner end of each is formed with a longitudinal slot 4 which receives suitable fastening means 5 whereby the bars or members 3 are adapted to be adjustably connected to the base 1. In this manner the attachment is susceptible of being readily adjusted to the drive wheels of different makes of machines. Short bars 6 are adapted to be connected to the outer ends of the bars or members 3 by means of bolts 7 or like fastening means. The bars or members 3 are disposed upon one side of the wheel with their inner ends engaging the inner ends of the spokes of the wheel and their outer ends engaging the felly or rim portion of the wheel. The bars 6 are disposed upon the opposite side of the wheel and are arranged crosswise of the bars 3 so as to engage adjacent spokes, the latter being clamped between complemental bars 3 and 6 by means of the bolts or fastenings 7. The bars 6 have adjustable connection with the bars 3 and for this purpose each of the bars 3 is provided with a plurality of openings 8 to receive the fastening 7.

The base 1 is provided centrally with an opening 9 for receiving the hub cap of the drive wheel, thereby enabling the attachment to lie close against the outer side of the wheel. Means for centering and retaining the attachment in centered position are applied to the side of the base 1 having the opening 9 so as to engage the hub of the drive wheel. The centering means comprise a plurality of elements 10 which consist of brackets or angle bars having the members secured to the base 1 longitudinally slotted to receive fastenings 11 which engage the base 1 and pass through the longitudinal slots of the elements 10. The inner ends of the elements 10 are offset to engage the outer end of the hub. When the attachment is in position the centering elements 10 are adjusted so that their inner ends are in contact with the hub of the drive wheel, such elements being securely held in the adjusted position by means of the fastenings 11 to prevent any possible displacement of the attachment.

In accordance with the present invention any motor vehicle, whether a pleasure car of a truck designed solely for haulage and delivery purposes may be utilized in the capacity of an engine for driving any machinery to be operated. When the motor vehicle is to be utilized in the capacity of an engine one of the drive wheels is elevated by means of a jack 12 so as to permit it to run free. The attachment is secured to the drive wheel from which the power is to be taken. A drive belt such as indicated by the dotted lines 13 in Fig. 1 is applied to the belt pulley 2 and extends to the machine to be driven. It will be understood that the motor vehicle may be easily adjusted to aline the drive belt and to maintain proper tension thereon, it being understood that the motor vehicle after being adjusted will be chocked to prevent displacement thereof while operating in the capacity of an engine for driving farm machinery or any mechanism to be mechanically operated. When the motor vehicle is to be used in its ordinary capacity the attachment is preferably removed so as not to be in the way or attract attention. It will thus be understood that the invention enables any type of motor vehicle to be utilized in the capacity of a portable engine for driving any machinery usually operated by means of an engine of the portable and stationary type.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

It is to be understood that the parts of the device which come in contact with the wheel are covered in a manner to prevent injury to the finish of the wheel by marring the surface thereof. It is also to be understood that the device is intended to be applied to such wheels only with which it may be advantageously used.

Having thus fully described my invention, what I claim as new and desire to secure by Letters Patent is:—

1. An attachment of the character specified, comprising a base provided with a belt pulley, bars adjustably connected with the base and adapted to engage one side of the drive wheel, elements coacting with the bars and adapted to engage the opposite side of the drive wheel and means for connecting the elements to the bars for clamping the drive wheel between them.

2. An attachment of the character specified, comprising a base provided with a belt pulley, bars, means for adjustably connecting the bars to the base, other bars and means for adjustably connecting the two sets of bars and adapted to effect the clamping of a drive wheel between them.

3. A device of the character set forth, comprising a base having a centrally disposed opening in one side and provided with a belt pulley, clamping means mounted upon the base for securing the same to the drive wheel of a motor vehicle and centering devices applied to a side of the base for securing the same in adjusted position against casual displacement.

In testimony whereof I affix my signature in presence of two witnesses.

LIEGH B. FREED.

Witnesses:
A. G. FREED,
VERI R. FREED.

Copies of this patent may be obtained for five cents each, by addressing the "Commissioner of Patents, Washington, D. C."